(12) United States Patent
Creamer et al.

(10) Patent No.: US 7,272,403 B2
(45) Date of Patent: Sep. 18, 2007

(54) SELECTIVE ENABLEMENT AND DISABLEMENT OF A MOBILE COMMUNICATIONS DEVICE BASED UPON LOCATION

(75) Inventors: Thomas E. Creamer, Boca Raton, FL (US); Neil A. Katz, Parkland, FL (US); Victor S. Moore, Lake City, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/292,638

(22) Filed: Dec. 2, 2005

(65) Prior Publication Data

US 2007/0129083 A1   Jun. 7, 2007

(51) Int. Cl.
*H04Q 7/20* (2006.01)
(52) U.S. Cl. .................. 455/456.1; 455/457
(58) Field of Classification Search ..... 455/456.1–457, 455/406–408, 418–420
See application file for complete search history.

(56) References Cited

U.S. PATENT DOCUMENTS

| | | | |
|---|---|---|---|
| 5,778,304 A * | 7/1998 | Grube et al. ............. | 455/456.4 |
| 6,122,486 A | 9/2000 | Tanaka et al. | |
| 6,463,289 B1 | 10/2002 | Havinis et al. | |
| 6,496,703 B1 | 12/2002 | da Silva | |
| 6,567,668 B1 | 5/2003 | Valentine et al. | |
| 6,628,934 B2 | 9/2003 | Rosenberg et al. | |
| 6,782,266 B2 | 8/2004 | Baer et al. | |
| 6,832,093 B1 * | 12/2004 | Ranta ....................... | 455/456.4 |
| 6,937,868 B2 | 8/2005 | Smith et al. | |
| 6,961,561 B2 | 11/2005 | Smith et al. | |
| 2004/0102179 A1 | 5/2004 | Matsumoto | |
| 2004/0171381 A1 | 9/2004 | Inselberg | |
| 2005/0075117 A1 | 4/2005 | Jang | |
| 2005/0170850 A1 * | 8/2005 | Edwards et al. ......... | 455/456.4 |
| 2005/0282559 A1 * | 12/2005 | Erskine et al. ........... | 455/456.4 |
| 2006/0019632 A1 * | 1/2006 | Cunningham et al. ...... | 455/408 |

FOREIGN PATENT DOCUMENTS

WO   WO2004/089021   10/2004

OTHER PUBLICATIONS

U.S. Appl. No. 10/755,829, Perepa et al.
U.S. Appl. No. 10/845,564, Brown

* cited by examiner

Primary Examiner—CongVan Tran
(74) Attorney, Agent, or Firm—Akerman Senterfitt

(57) ABSTRACT

A system for controlling the functionality of a mobile communications device based upon geographic location is provided. The system includes a location determining unit to determine a geographic location of the mobile communications device. The system further includes a location database in communication with the location determining unit. The location database contain one or more data elements designating one or more geographic locations as communications-limited zones within which the mobile communications device is precluded from performing one or more predetermined functions.

17 Claims, 3 Drawing Sheets

SELECTIVE ENABLEMENT AND DISABLEMENT OF A MOBILE COMMUNICATIONS DEVICE BASED UPON LOCATION

FIELD OF THE INVENTION

The present invention is related to the field of electronic communications and, more particularly, to mobile communications devices.

BACKGROUND OF THE INVENTION

The persistent pace of development in wireless communications technology continues to add to the capability and functionality of mobile communications devices. Mobile communications devices now allow device users to transmit and receive voice, data, pictures, and even video using the radio-frequency spectrum rather than more conventional fixed, physical connections of metal wire or fiber optic cable. Advances in wireless communications technology, accordingly, have provided tremendous flexibility as to where and when mobile device users can transmit and receive various forms of information.

Continuing improvements in wireless communications are expected to further add to the capability and functionality of mobile communications devices. Current mobile communications devices are able to transmit and receive at relatively low rates, around 100 kbps, over second-generation (2G) networks using various digital encoding protocols, such as the Global System for Mobile communications (GSM) protocol, the Digital-Advanced Mobile Phone Service (D-AMPS) protocol, a time division multiple access (TDMA) protocol, and a code division multiple access (CDMA) protocol. Mobile communications devices, meanwhile, are becoming ever more sophisticated, with many such devices having the capability to provide high-resolution displays and to perform as integrated cameras. Many experts believe that in the near future mobile communication devices will be able to receive and transmit at broadband speeds around 2 mbps, and even greater speeds with the eventual adoption of fourth-generation (4G) devices. Such devices are expected to be able to transmit and receive not only pictures, but high-speed video and high-fidelity audio as well.

Despite the undeniable benefits conferred by such advances in mobile communications devices, they also give rise to a new challenge, namely, how to adequately protect content providers like producers of concerts and plays, sponsors of sporting events, and performing musicians. These content providers face the risk that an enhanced-capability mobile device can be used as a medium to widely broadcast, for example, a sporting event or concert without the consent of the content provider. As yet, there are no effective ways to mitigate this risk.

Conventional technology further fails to fully provide opportunities for content providers to capture the gains that could otherwise be generated by wireless communications devices having enhanced capabilities. Content providers who would not want a mobile device user to use the device to impermissibly broadcast content such as video images or audio signals relating to a sporting event or concert might nonetheless welcome the chance to charge a fee for such a broadcast. With fourth-generation (4G) devices and networks, consumers might be equally eager to transmit and receive broadcasts of such content, especially since such devices and networks are likely to have the capability to transmit and receive high-fidelity audio as well as broadcast video. Few if any mechanisms yet exist, however, that would allow content providers and potential consumers of content to efficiently allocate property rights governing the transmission and receipt of content via wireless communications devices.

SUMMARY OF THE INVENTION

The present invention provides for the control of predetermined functions performed by a mobile communications device. The control of predetermined functions can include selectively enabling and/or disabling one or more functions based on a geographic location of the mobile communications device.

One embodiment of the invention is a system for controlling the functionality of a mobile communications device based upon geographic location. The system can include a location determining unit to determine a geographic location of the mobile communications device. The system can further include a location database in communication with the location determining unit. The location database can contain data elements that designate at least one geographic location as a communication-limited zone within which the mobile communications device is precluded from performing at least one predetermined function.

Another embodiment of the invention is a system for allocating property rights in information content conveyed with a mobile communications device. The system can include a service controller for selectively enabling and disabling at least one predetermined communications function performed by the mobile communications device based on a geographical location. Additionally, the system can include a location database in communication with the service controller, the location database containing data elements that designate at least one geographic location as a communications-controlled zone. The system can further include a transacting unit for assessing a fee charged to a user of the mobile communications device in response to the service controller selectively enabling the mobile communications device to perform the at least one predetermined communications function when the communications device is located in a communication-controlled zone.

Yet another embodiment of the invention is a method for controlling the functionality of a mobile communications device based upon geographic location. The method can include identifying a geographic location of the mobile communications device. The method additionally can include determining whether the mobile communications device is prohibited from performing at least one predetermined communications function, the determination being based on the geographic location of the device.

Still another embodiment of the invention is a computer-readable storage medium. The computer-readable storage medium can include one or more computer instructions for identifying a geographic location of the mobile communication device. Additionally, the computer-readable storage medium can include one or more computer instructions for determining, based on the geographic location of the device, whether the mobile communication device is authorized to perform at least one predetermined function.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION

The present invention allows the functionality of a mobile communications device to be controlled based on the geographic location of the device. By controlling the functionality of the mobile communications device, certain capabilities of the device can be selectively enabled and/or disabled in accordance with where the device is located at a particular time. Control of device functionality based on geographic location can be used to prevent a user of a mobile communications device from illicitly broadcasting video and/or audio signals relating to a sports contest, concert, or other such event. Moreover, selective enablement of different functionalities of a mobile communications device can also be used as a mechanism by which a sponsor of such an event can charge a fee for allowing a device user to broadcast the event using a particular functionality of the device.

Figure 1:
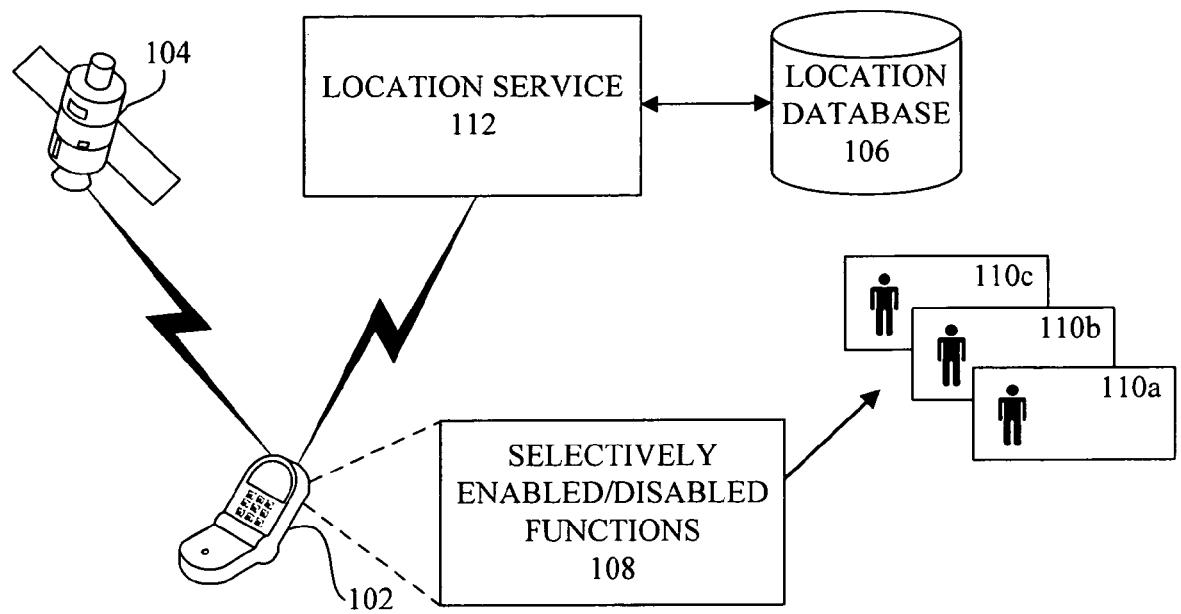
FIG. 1 is a schematic view of a system for selectively controlling the functions performed with a mobile communications device, according to one embodiment of the invention.

FIG. 1 is schematic illustration of a system 100 for controlling the functionality of a mobile communications device 102 based upon geographic location, according to one embodiment of the invention. The system 100 illustratively includes a location determining unit 104 that determines a geographic location of the mobile communications device 102. The system 100 further illustratively includes a location database 106 in communication with the location determining unit 104, the location database containing data elements that designate one or more geographic locations as communication-limited zones within which the mobile communications device 102 is precluded from performing at least one predetermined function.

The mobile communications device 102 illustratively includes a plurality of capabilities or functions 108 that the device can perform. According to one embodiment, the mobile communications device 102 has the capability to perform as a data communications network-enabled device that operates according to a specific protocol, such as the Internet protocol (IP). A particular capability of the mobile communications device 102, according to this embodiment, is the capability to connect to a Web service through which a data stream can be broadcast to one or more users 110a-c of devices having the capability to receive and process the data stream. Such devices, for example, could constitute a class of video weblog, or "blog," rooms, as will be readily understood by one of ordinary skill in the art. The device users 110a-c, accordingly, are able to select a particular channel to which they subscribe and to view over the channel a broadcast transmitted by the mobile communications device 102.

Additionally or alternatively, the mobile communications device 102 itself can have capabilities that permit the device to function as a mobile IP video stream server (supported through mobile-IP) by which end-use subscribers can connect directly to the device and access a video stream. The capability of the mobile communications device 102 to perform the function of a mobile IP video stream would inevitably be limited by the bandwidth of the wireless channel used to broadcast the video stream, and a broadcaster using the device would necessarily limit the number of video streams supplied based upon the available bandwidth.

Yet a third capability that the mobile communications device 102 can have is to function as a mobile IP video server supporting multi-cast IP. With this function, end-use subscribers having access to a multi-cast IP network are able to subscribe to a multi-cast IP stream provided by the mobile communications device 102. The three different functions described are merely representative, and it will be readily apparent to one of ordinary skill that the system and procedures described herein apply equally well with respect to various other functions performed by different types of mobile communications devices. Indeed, the system and procedures described herein apply generally to mobile communications device having the capability to convey audio, video, and/or other forms of information content to one or more devices configured to receive the information content.

Independent of which functions the mobile communications device 102 is capable of performing, the location determining unit 104 determines the geographic location of the device. According to one embodiment, the location determining unit 104 comprises a global positioning satellite (GPS) system. Based on an emitted signal, the GPS system locates the mobile communications device 102 and returns a signal indicating the location. The indicated location is illustratively conveyed by the mobile communications device 102 itself to a location service 112 that maintains the location database 106. In an alternative embodiment, the GPS system or other location determining unit 104 can convey an indicator of the geographic location of the mobile communications device 102 directly to the location service 112.

It is to be noted at this juncture, however, that the invention is location-protocol agnostic in the sense that the location determining unit 104 can utilize various other location-determining protocols apart from that based on the GPS system. For example, according to another embodiment, the location determining unit 104 can determine the location of the mobile communications device 102 based on a protocol utilized by a provider of network communications services to the particular device. In the context of a cellular device, for example, a provider of cellular services can determine a location of the device based on various indicators, such as the channel allocated to the device or a signal exchange between the service provider and the mobile communications device. According to still other embodiments, the location determining unit 104 can determine the location of the mobile communications device 102 using known direction finding and/or distance determining mechanisms, such as those based on a direction and/or strength of a signal emitting from the device and received by a receiver at a predetermined location.

The location service 112 can be the same as the service provider that handles network communications of the mobile communications device 102 or, alternatively, a separate entity that handles locating services and maintains the location database 106 on behalf of one or more service providers. Optionally, the system 100 further includes a functionality determiner (not shown) that determines whether the mobile communications device 102 has one or more predetermined functional capabilities such as those already described.

Using the location determining unit 104 in conjunction with the location database 106 of the system 100, the service provider is able to identify a geographic location of the mobile communications device 102 at a given time and, based on the identified geographic location, determine whether the device is prohibited from performing one or more predetermined communications functions. If the mobile communications device 102 is prohibited from performing a predetermined communications function, then the location service 112 can refuse to enable the function if a device user signals a request to perform the function. Alternatively, if the mobile communications device 102 is already enabled for performing the predetermined communications function, then the location service 112 can take active steps to disable the device from performing the function as long as the device is located within a particular geographic area.

Optionally, the location service 112 can provide a message to the mobile communications device 102 informing a user of the device that performance of one or more communications functions is prohibited as long as the device is located at the particular geographic location. Refusal to enable or affirmative disablement of a function on the device can be limited to a time period corresponding to a particular event, such as a sporting event or concert.

Figure 2:
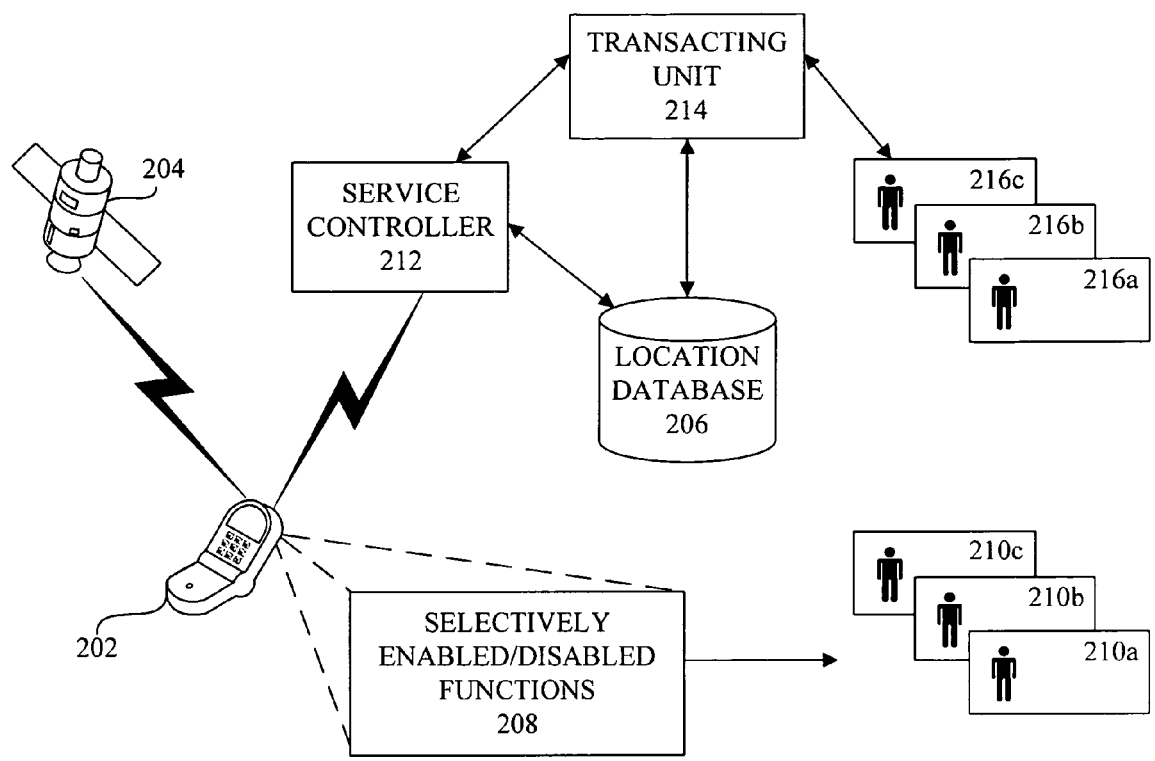
FIG. 2 is a schematic view of a system for selectively enabling/disabling different functionalities of a mobile communications device, according to another embodiment of the invention.

FIG. 2 schematically illustrates a system 200 for allocating property rights in information content conveyed with a mobile communications device 202, according to another embodiment of the invention. The system 200 illustratively includes a service controller 212 for selectively enabling and disabling one or more predetermined communications functions 208 performed by the mobile communications device 202 based on the geographical location of the device. Additionally, the system 200 illustratively includes a location database 206 in communication with the service controller 212, the location database containing data elements that designate at least one geographic location as a communications-controlled zone. The system 200 further illustratively includes a transacting unit 214 for assessing a fee charged to a user of the mobile communications device for selectively enabling the mobile communications device 202 to perform one or more predetermined communications functions when the communications device is located in a communication-controlled zone.

The service controller 210, according to one embodiment, can include a transceiver unit (not shown) for transmitting and receiving wireless signals to and from the mobile communications device 202. The signals may be transmitted to and received from the mobile communications device 202 directly or, alternatively, through an intermediary, such as a cellular tower forming part of a cellular wireless network.

A predetermined communication function performed by the mobile communications device 202 can include broadcasting or otherwise conveying data content in one or more forms. When the mobile communications device 202 is enabled to perform a predetermined communication function, a user of the device is able to broadcast or otherwise convey audio, video, and/or other data content with the device even though the device is located in a communications-controlled zone. The communications-controlled zone can be a geographical area in which a sporting contest, concert, or other event is occurring. Thus, using the mobile communications device 202, the user is able to broadcast or convey data content relating to the event to users 210a-c of devices capable of receiving and processing the data content.

The service controller 212, according to the invention, only enables the mobile communications device 202 to perform the predetermined function if the user consents to paying a fee. Alternatively, if the mobile communications device 202 is already enabled to perform the predetermined function, then the service controller 212 disables the function when the device is located in the communications-controlled zone unless the user consents to paying the fee. Data elements contained in the location database 206 can include, for example, one or more fields that indicate whether a particular function can be enabled for a fee and, if so, what the fee is to be.

According to one embodiment, the service controller 212 provides a message to the user of the mobile communications device 202 indicating that a fee is to be charged for enabling one or more at least one predetermined communications function. The service controller 212 can receive a response from the user indicating agreement to the charge. In response to the user's indicating agreement, the service controller 212 can enable or avoid disabling the agreed upon function to be performed with the mobile communications device 202. According to another embodiment, the user of the mobile communications device 202 is able to transact in advance of a particular event with a service provider or other entity to secure access to a particular function performed by the device during the event.

The geographic area to be designated as a communications-controlled zone as well as the particular functions 208 of the mobile communications device 202 that are only enabled subject to a fee can both be agreed to by a content provider, such as a sponsor of a sporting contest or concert. The transacting unit 214, according to one embodiment, can receive information regarding geographical areas to be so designated as well as corresponding for-fee functions, the information being that provided by one or more content providers 216*a-c* who sponsor different events at various times.

The fee to be charged for enabling one or more functions 208 on the mobile communications device 202 can be negotiated by different content providers 216*a-c* with a service provider or, alternatively, with another entity that maintains the service controller 212, location database 206, and/or transacting unit 214 on behalf of the service provider. The fee can be assessed according to various criteria. For example, a fee can be based on the length of time that one or more functions is enabled (e.g., per-minute-function). Alternatively, the fee can be assessed on a per event basis, on a per number of streams of data content basis, or on a per number of connections basis. According to one particular embodiment, the fee can vary according to the proximity of the mobile communications device 202 to the particular event to which the data content conveyed with the device relates. According to still another embodiment, the fee can vary according to the quality of the data conveyed with the mobile communications device 202 when a particular function 208 is enabled.

According to one embodiment, the transacting unit 214 can monitor one or more mobile communications devices to determine which mobile communications devices use which functions within which communications-limited zones. The transacting unit 214, for example, can determine the period of use of a function, the number of data streams, and/or connections maintained. Accordingly, for a specific mobile communications device 202, the transacting unit 214 can generate a charge to the user of the mobile communications device 202 based on a particular fee structure or pricing model. The charge is determined in response to enabling the performance of at least one of the communications function 208 the mobile communications device 202 is capable of performing. Optionally, the transacting unit 214 can further perform an accounts-settlement function whereby the unit computes a remittance to be received by a content provider based on the charge to the user of the mobile communications device 202.

Figure 3:
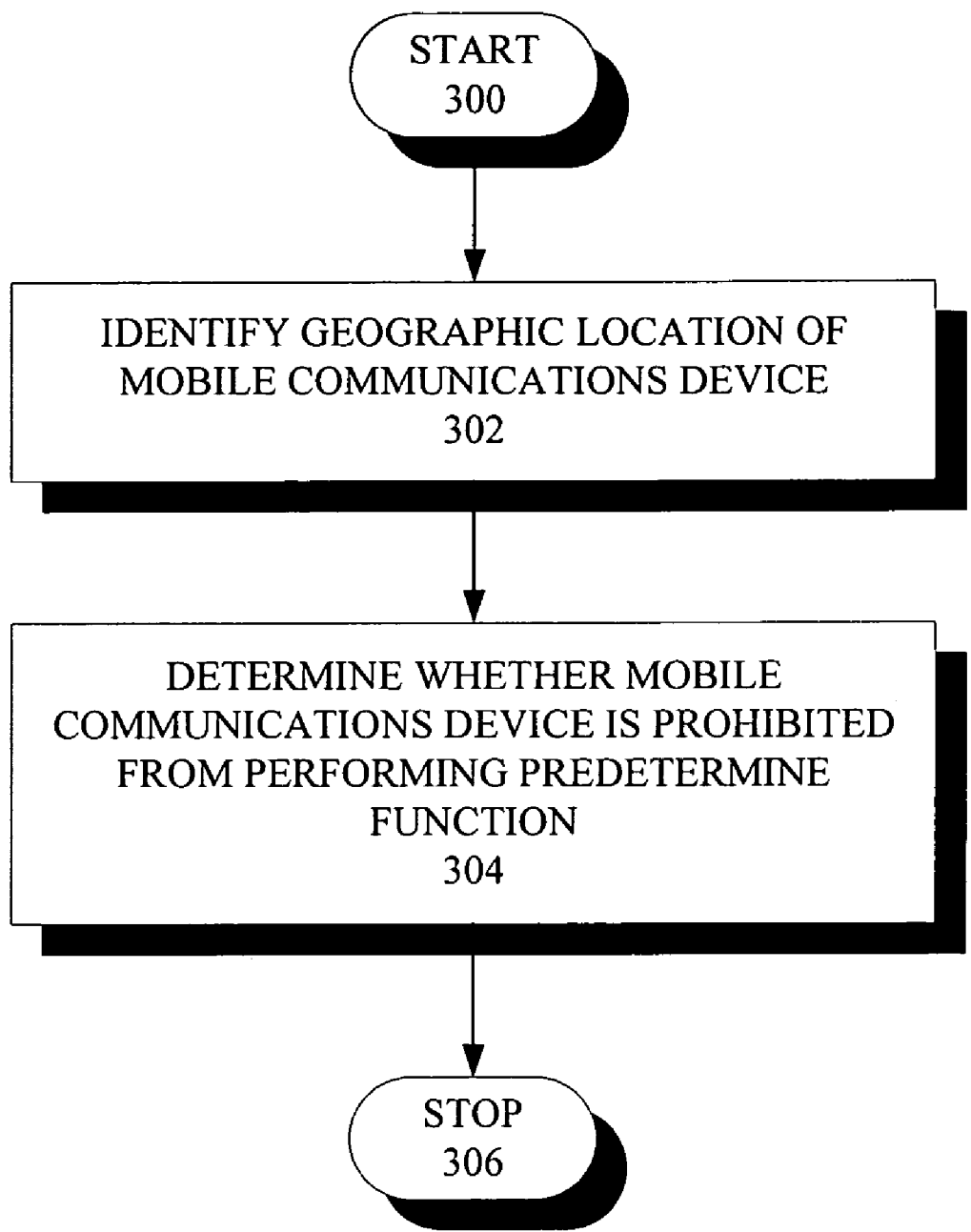
FIG. 3 a flowchart of exemplary steps for performing a method of controlling the functionality of a mobile communications device based upon geographic location, according to yet another embodiment of the present invention

FIG. 3 is a flowchart of exemplary steps for performing a method 300 of controlling the functionality of a mobile communications device based upon geographic location, according to yet another embodiment of the present invention. Illustratively, the method 300 includes identifying a geographic location of the mobile communications device at step 302. The method further includes, at step 304, determining whether the mobile communications device is prohibited from performing at least one predetermined communications function, the determination being based upon the geographic location of the device. The method illustratively concludes at step 306.

The step 304 of determining whether the mobile communications device is prohibited from performing at least one predetermine communications function can include querying a location database containing data elements designating at least one geographic area as a communications-controlled zone within which the mobile communications device is prohibited from performing the at least one predetermined communications function during a predetermined time period. The method 300 can further include receiving information from at least one content provider designating at least one geographic area as a communications-controlled zone during a predetermined time period. Accordingly, the method 300 can also include adding to the location database a data element corresponding to the at least one geographic area and predetermined time.

The method 300 optionally can further include denying a functionality to the mobile communications device for performing the at least one predetermined communications function when the mobile communications device is located within a predetermined geographic location. The method 300 also can optionally include providing a message to the mobile communications device informing a user that performing the at least one predetermined communications function is prohibited when the mobile communications device is located within a predetermined geographic location during a predetermined time period. According to still another embodiment, the method 300 can optionally include enabling a user of the mobile communications device to perform the at least one predetermined communications function if the user consents to pay a predetermined fee.

The invention can be realized in hardware, software, or a combination of hardware and software. The invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The invention can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

We claim:

1. A method of controlling the functionality of a mobile communications device based upon geographic location, the method comprising:

identifying a geographic location of the mobile communications device;

based on the geographic location, determining whether the mobile communications device is prohibited from performing at least one predetermined communications function by querying a location database containing data elements designating at least one geographic area as a communications-controlled zone within which the mobile communications device is prohibited from performing the at least one predetermined communications function during a predetermined time period;

receiving from at least one content provider at least one geographic area to designate as a communications-controlled zone during a predetermined time period and adding to the location database a data element corresponding to the at least one geographic area and predetermined time;

determining whether the at least one content provider has consented to a for-fee performance of the predetermined communications function within the designated communications-controlled zone; and, computing a fee for the performance of the predetermined communications function, wherein the fee is based upon at least one of a number of streams of data conveyed by the mobile communications device, a quality of data conveyed by the mobile communications device, and a number of connections established by the mobile communications device with one or more additional communications devices if a user of the mobile communications device elects to convey for-fee data content to one or more other communications devices.

2. The method of claim 1, further comprising selectively denying a functionality to the mobile communications device for performing the at least one predetermined communications function when the mobile communications device is located within a predetermined geographic location.

3. The method of claim 1, further comprising providing a message to the mobile communications device informing a user that performing the at least one predetermined communications function is prohibited when the mobile communications device is located within a predetermined geographic location during a predetermined time period.

4. The method of claim 1, further comprising enabling a user of the mobile communications device to perform the at least one predetermined communications function if the user consents to pay a predetermined fee.

5. The method of claim 1, wherein the step of identifying comprises identifying a current position of the mobile communications device based on at least one of data received from a global positioning system (GPS) satellite, a signal exchange between the mobile communications device and a communications service provider, a direction of a signal from the mobile communications device to a receiver located at a predetermined location that receives a signal from the mobile communications device, and a strength of a signal from the mobile communications device to a receiver located at a predetermined location that receives a signal from the mobile communications device.

6. The method of claim 1, further comprising receiving from at least one content provider an indicator indicating at least one communications function that the mobile communication is prohibited from performing within the at least one geographic area during the predetermined time.

7. A system for controlling the functionality of a mobile communications device based upon geographic location, the system comprising:

a location determining unit to determine a geographic location of the mobile communications device;

a location database in communication with the location determining unit, the location database containing data elements that designate at least one geographic location as a communication-limited zone within which the mobile communications device is precluded from performing at least one predetermined function;

wherein the location determining unit is configured to query the location database to determine whether the mobile communications device is located in a communications-limited zone, to receive from at least one content provider at least one geographic area to designate as a communications-limited zone during a predetermined time period, to add to the location database a data element corresponding to the at least one geographic area and predetermined time, and to determine whether the at least one content provider has consented to a for-fee performance of the predetermined communications function; and a transacting unit for assessing a fee charged to a user of the mobile communications device in response to the service controller selectively enabling the mobile communications device to perform the least one predetermined communications function when the communications device is located in a communication-controlled zone;

wherein the transacting unit is configured to compute the fee based upon at least one of a number of streams of data conveyed by the mobile communications device, a quality of data conveyed by the mobile communications device, and a number of connections established by the mobile communications device with one or more additional communications devices if a user of the mobile communications device elects to convey for-fee data content to one or more other communications devices.

8. The system of claim 7, wherein the mobile communications device is an Internet protocol-enabled mobile communication device having a capability to communicatively link to a Web server that conveys a data stream.

9. The system of claim 7, wherein the mobile communications device is mobile communications device having a capability to provide an Internet protocol-enabled video data stream.

10. The system of claim 7, wherein the mobile communications devices is a mobile communications device having a capability to operate as a mobile Internet protocol-enabled video server.

11. The system of claim 7, further comprising a mobile communications device functionality determiner to determine whether the mobile communications has at least one of a predetermined set of functional capabilities.

12. A system for allocating property rights in information content conveyed with a mobile communications device, the system comprising:

a service controller for selectively enabling and disabling at least one predetermined communications function performed by the mobile communications device based on a geographical location;

a location database in communication with the service controller, the location database containing data elements that designate at least one geographic location as a communications-controlled zone and further indicating whether at least one content provider has consented to a for-fee performance of the predetermined communications function; and a transacting unit for assessing a fee charged to a user of the mobile communications device in response to the service controller selectively enabling the mobile communications device to perform the least one predetermined communications function when the communications device is located in a communication-controlled zone;

wherein the transacting unit is configured to receive information from the at least one content provider, the received information indicating a geographical area as a communications-controlled zone and further indicating a fee for performing the at least one communications function when the mobile communications device is located within the communications-controlled zone;

wherein the transacting unit is further configured to compute the fee based upon at least one of a number of streams of data conveyed by the mobile communications device, a quality of data conveyed by the mobile communications device, and a number of connections established by the mobile communications device with one or more additional communications devices if a user of the mobile communications device elects to convey for-fee data content to one or more other communications devices.

13. The system of claim 12, wherein the service controller provides a message to the user of the mobile communications device indicating a fee for enabling the at least one predetermined communications function.

14. The system of claim 12, wherein the service controller enables the at least one predetermined communications function if the user of the communications device signals agreement to pay the assessed fee.

15. The system of claim 12, wherein the transacting unit generates a charge to the user of the mobile communications device in response to enabling the performance of the at least one communications function.

16. The system of claim 15, wherein the transacting unit computes a remittance to be received by a content provider based on the charge to the user of the mobile communications device.

17. A system for allocating property rights in information content conveyed with a mobile communications device, the system comprising:

a service controller for selectively enabling and disabling at least one predetermined communications function performed by the mobile communications device based on a geographical location;

a location database in communication with the service controller, the location database containing data elements that designate at least one geographic location as a communications-controlled zone and further indicating whether at least one content provider has consented to a for-fee performance of the predetermined communications function; and a transacting unit for assessing a fee charged to a user of the mobile communications device in response to the service controller selectively enabling the mobile communications device to perform the least one predetermined communications function when the communications device is located in a communication-controlled zone, the fee being computed by the transacting unit based upon at least one of a number of streams of data conveyed by the mobile communications device, a quality of data conveyed by the mobile communications device, and a number of connections established by the mobile communications device with one or more additional communications devices if a user of the mobile communications device elects to convey for-fee data content to one or more other communications devices;

wherein the transacting unit is configured to receive information from the at least one content provider, the received information indicating a geographical area as a communications-controlled zone and further indicating a fee for performing the at least one communications function when the mobile communications device is located within the communications-controlled zone;

wherein the transacting unit is further configured to generate a charge to the user of the mobile communications device in response to enabling the performance of the at least one communications function and further configured to compute a remittance to be received by a content provider based on the charge to the user of the mobile communications device.

* * * * *